(12) United States Patent
Li et al.

(10) Patent No.: US 7,839,773 B2
(45) Date of Patent: Nov. 23, 2010

(54) MODEM TIMING OFFSET COMPENSATION FOR LINE CARD REDUNDANCY FAILOVER

(75) Inventors: De Fu Li, Wayland, MA (US); Pawel Sowinski, Northborough, MA (US); James An, Sunnyvale, CA (US); Robert Goguen, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 261 days.

(21) Appl. No.: 12/075,838

(22) Filed: Mar. 14, 2008

(65) Prior Publication Data

US 2009/0232111 A1 Sep. 17, 2009

(51) Int. Cl.
*H04J 3/00* (2006.01)
*H04J 1/00* (2006.01)
*H04L 12/26* (2006.01)
*H04N 7/173* (2006.01)

(52) U.S. Cl. ............... 370/229; 370/431; 370/486; 725/111; 725/114

(58) Field of Classification Search .............. None
See application file for complete search history.

(56) References Cited

U.S. PATENT DOCUMENTS

| | | | |
|---|---|---|---|
| 6,839,829 B1 * | 1/2005 | Daruwalla et al. | ............ 712/28 |
| 7,035,251 B2 * | 4/2006 | Hebsgaard et al. | .......... 370/352 |
| 7,058,007 B1 | 6/2006 | Daruwalla et al. | |
| 7,068,712 B1 | 6/2006 | Zang et al. | |
| 7,684,315 B1 | 3/2010 | Beser | |
| 2002/0066110 A1 | 5/2002 | Cloonan et al. | |
| 2002/0191684 A1 | 12/2002 | Min et al. | |
| 2003/0058892 A1 | 3/2003 | Dworkin et al. | |
| 2004/0034871 A1 * | 2/2004 | Lu et al. | ............... 725/111 |
| 2004/0045033 A1 | 3/2004 | Cummings et al. | |

(Continued)

OTHER PUBLICATIONS

Notification of Transmittal of the International Search Report and the Written Opinion of the International Searching Authority, International Search Report and Written Opinion attached, issued in PCT/US2009/001270, dated Sep. 30, 2009 (12 pages).

*Primary Examiner*—Chi H Pham
*Assistant Examiner*—Soon-Dong D Hyun
(74) *Attorney, Agent, or Firm*—Hamilton, Brook, Smith & Reynolds, P.C.

(57) ABSTRACT

In one embodiment, a first ranging timing description describing at least a duration of time during which a subject cable modem (CM) may burst and a duration of time during which the subject CM and other CMs in a multiple access network are not permitted to burst is translated into a second ranging timing description describing a duration during which a burst from the subject CM is expected to be received by a cable modem termination system (CMTS). The CMTS is conditioned to receive a burst from the subject CM during the duration of time described by the second ranging timing description. A timing offset is determined from at least an actual time a burst from the subject CM is received by the CMTS and the duration of time during which the subject CM and other CMs in the multiple access network are not permitted to burst to produce a determined timing offset. The determined timing offset is reported to compensate for delay in the multiple access network and the subject CM.

23 Claims, 11 Drawing Sheets

U.S. PATENT DOCUMENTS

| | | |
|---|---|---|
| 2004/0139473 A1* | 7/2004 | Greene .................... 725/111 |
| 2004/0163120 A1 | 8/2004 | Rabenko et al. |
| 2004/0202203 A1 | 10/2004 | Kolze et al. |
| 2005/0097617 A1 | 5/2005 | Currivan et al. |
| 2005/0251841 A1* | 11/2005 | Boyce et al. ............. 725/111 |
| 2005/0254417 A1 | 11/2005 | Walston |
| 2006/0013262 A1 | 1/2006 | Downey et al. |
| 2006/0182148 A1* | 8/2006 | Hebsgaard et al. .......... 370/503 |
| 2007/0140209 A1* | 6/2007 | Hebsgaard et al. .......... 370/345 |
| 2009/0034594 A1 | 2/2009 | Zhang |

* cited by examiner

705 us_ch_id: 1    ucd_count: 2    num_elems: 10    reserved: 0
Alloc Start Time: 19681040           Ack Time: 19680632
Rng_bkoff_start: 3    Rng_bkoff_end: 6
Data_bkoff_start: 3    Data_bkoff_end: 5

720a → sid:8191    iuc:2    mslot_offset:0
       sid:3       iuc:4    mslot_offset:10   — 715
720b → sid:8191    iuc:2    mslot_offset:18
       sid:2       iuc:4    mslot_offset:28

. . .

710 us_ch_id: 1    ucd_count: 2    num_elems: 10    reserved: 0
Alloc Start Time: 19681040           Ack Time: 19680632
Rng_bkoff_start: 3    Rng_bkoff_end: 6
Data_bkoff_start: 3    Data_bkoff_end: 5 sid:3    iuc:4    mslot_offset:0    — 725
sid:2    iuc:4    mslot_offset:28

MODEM TIMING OFFSET COMPENSATION FOR LINE CARD REDUNDANCY FAILOVER

TECHNICAL FIELD

The present disclosure relates generally to cable modems and cable modem termination systems.

BACKGROUND

A cable modem network or "cable plant" employs cable modems, which are an improvement over conventional PC data modems and provide high speed connectivity. Digital data on upstream and downstream channels of the cable network is carried over radio frequency ("RF") carrier signals. Cable modems convert digital data to a modulated RF signal for upstream transmission and demodulate a downstream RF signal to bit streams for use by computers. The conversion is done at a subscriber's home. At a cable modem termination system ("CMTS") located at a head end of the cable network, the conversions are reversed. The CMTS converts downstream digital data to a modulated RF signal, which is carried over the fiber and coaxial lines to the subscriber premises. On the return path, the CMTS receives the modulated upstream RF signal, which it demodulates and transmits to an external node. A current standard for transmission of data over cable networks is the Data-Over-Cable Service Interface Specification ("DOCSIS").

In earlier cable networks, there was no provision for any redundancy at the CMTS. Without redundancy, a failure of the one of the CMTS resulted in a service disruption or service outage of the cable modems relying upon the failed element. In such networks, the failed CMTS had to be repaired or replaced before service could resume. This meant that service could be out for an extended period. From the perspective of the service provider and the end user, any type of disruption or delay in service is extremely undesirable.

In a known system, an N+1 redundancy technique employs at least two CMTS interfaces (e.g., line cards) on one or more CMTS chassis at the head end of a cable network. One of the CMTSs serves as a backup or "protecting" CMTS. When another CMTS (a "working" CMTS) becomes unavailable to service its group of cable modems, the protecting CMTS takes over service to those cable modems. The protecting CMTS provides service on the same downstream and upstream channels as used by the working CMTS.

In load balancing, cable modems are moved among upstream and downstream channels after their initial registration and coming online while potentially passing traffic. Cable modems that are currently online are moved when the load difference between two interfaces exceeds a user-defined percentage. In this way, service providers are allowed to optimally use both downstream and upstream bandwidth, enabling the deployment of new, high-speed services such as voice and video services. Additionally, load balancing may help reduce network congestion due to the uneven distribution of cable modems across the cable network and due to different usage patterns of individual customers. Load balancing may be enhanced and supported by implementing the Dynamic Channel Change (DCC) protocol primitive.

BRIEF DESCRIPTION OF THE DRAWINGS

Illustrated in the accompanying drawings are example embodiments in which like reference characters refer to the same parts throughout the different views. The drawings are not necessarily to scale, emphasis instead being placed upon illustrating example embodiments.

DESCRIPTION OF EXAMPLE EMBODIMENTS

It should be noted, illustrated embodiments of the present approach described herein are described using a cable modem (CM) and cable modem termination system (CTMS) in a Time Division Multiple Access (TDMA) network, in which the CM and the CMTS transmit data per DOCSIS 2.0 standard. However, it should be noted, other protocols and communication techniques may be adapted to be used with the illustrated embodiments of the present approach described herein. From example, the illustrated embodiments are applicable to other multiple or multiplexed access methods besides TDMA, such as Synchronous Code Division Multiple Access (SCDMA).

An important requirement of N+1 redundancy for CMTS in the cable network is to keep working modems online during a switchover to the protection line card. During a switchover from a failed CMTS line card to a protection CMTS line card, the timing offset (i.e., round-trip delay from CMTS to modem) for the affected cable modems usually changes relative to the protection line card. This change or difference in timing offset occurs because, even though the failed and protection CMTS line cards are likely co-located, the round-trip propagation delay changes due to physical differences in the cabling and in the line cards themselves. Delay components contributing to a round-trip propagation delay or "timing offset" (described in reference to FIG. 8) may differ from one instance to another. A first timing offset in a first instance may not be the same as a second timing offset in a second instance, differ from another by some amount. With the wrong timing offset (i.e., a timing offset which does not account or otherwise compensate for a difference in timing offsets), the CMTS is not able to correctly receive any data packets from the cable modems and, after a timeout period, the cable modems eventually go offline. This problem exists for cable modem transmission at any symbol rate, and is more severe when symbol rates are higher.

Similar issues are present with load balancing in which a subject cable modem (CM) is moved from a first downstream (DS) channel to a second DS channel to distribute the load of the subject CM amongst the loads of other CMs in a Time Division Multiplex Access (TDMA) network. There may be a difference between a first timing offset for the subject CM on the first DS channel and a second timing offset for the subject CM on the second DS channel because the two channels are not precisely synchronized with each other. This may be the case when one of the DS channels is an integrated DS channel and the other is a modular DS channel.

Overview

Accordingly, in one example embodiment of the present approach, in a first bandwidth allocation map for use by a subject cable modem (CM), an idle region is added before and after a burst region during which the subject CM may burst to form added idle regions. Neither the subject CM nor other CMs in a multiple access network, such as a Time Division Multiple Access (TDMA) network or a Synchronous Code Division Multiple Access (SCDMA) network, are permitted to burst during the added idle regions. In a second bandwidth allocation map for use by a cable modem termination system (CMTS), a region during which a burst from the subject CM is expected to be received by the CMTS is expanded by the added idle regions to form an expanded burst region. A timing offset is determined from an actual time a burst from the CM is received by the CMTS and the added idle regions based on the expanded burst region to produce a determined timing offset. A delay in the multiple access network and the subject CM is compensated for by reporting the determined timing offset.

In another example embodiment of the present approach, a change in a determined timing offset and a timing offset previously determined for a subject cable modem (CM) is determined to produce a determined change in timing offset. Timing offsets for other CMs in the multiple access network determined previously are then adjusted with the determined change in timing offset to produce adjusted timing offsets.

Figure 1:
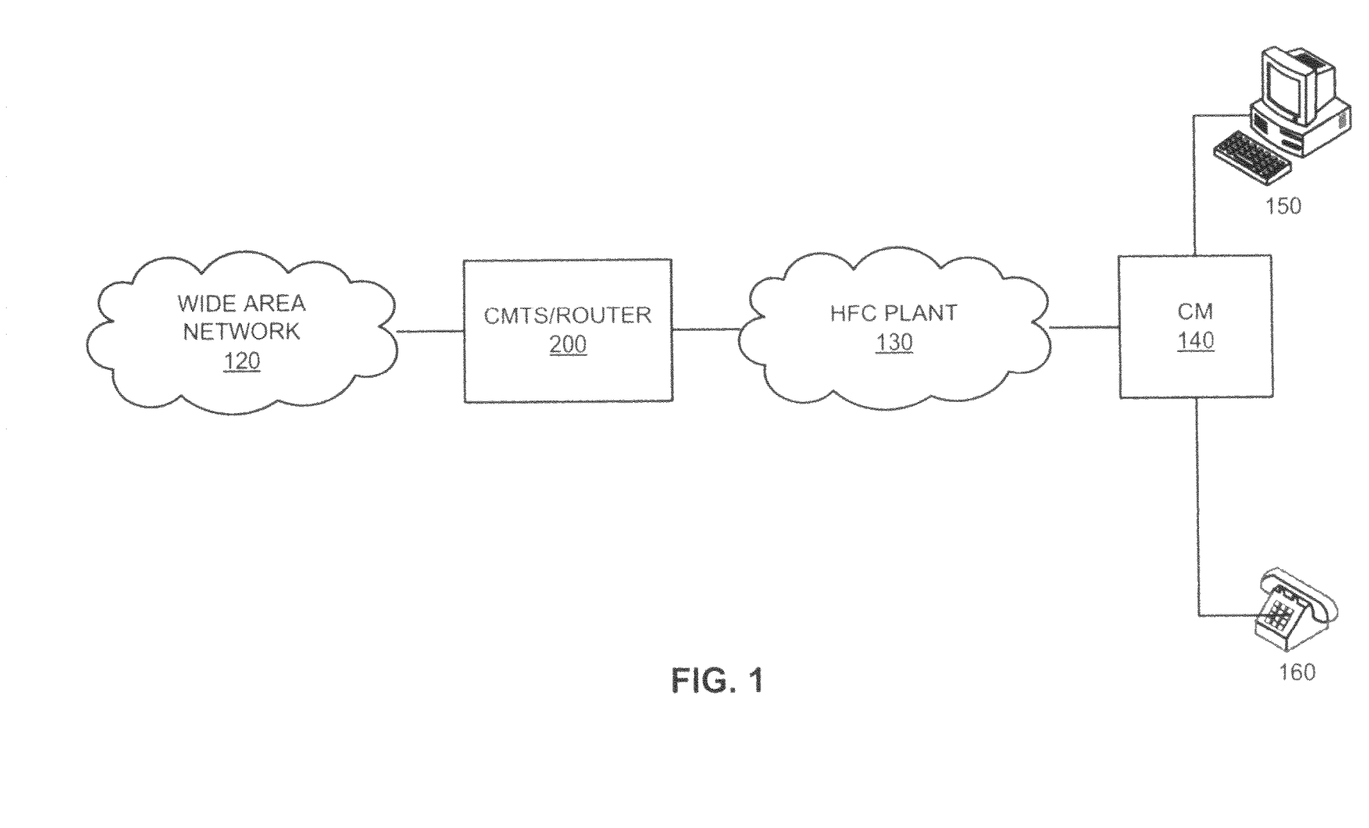
FIG. 1 illustrates an example cable network.

FIG. 1 illustrates an example two-way hybrid fiber-coaxial (HFC) cable network system. It shows a wide area network 120, CMTS router 200, HFC plant 130 and cable modem 140. Cable modem (CM) 140 is, in turn, connected to a subscriber computer 150 and telephony device 160. It should be understood that, while for simplicity only one CM is shown, there may be hundreds or thousands of CMs connected to the CMTS router in an example network configuration. Furthermore, the CM 140 may be a cable a modem cable modem with an embedded media terminal adaptor (MTA) integrating cable modem and voice over internet protocol (VoIP) endpoint functionalities.

The CMTS (1) receives signals from the wide area network 120 and converts the format of those signals, e.g., microwave signals to electrical signals suitable for transmission over the HFC plant 130; (2) provides appropriate Media Access Control (MAC) level packet headers for data received by the cable system; and (3) modulates and demodulates the data to and from the HFC plant.

Figure 2:
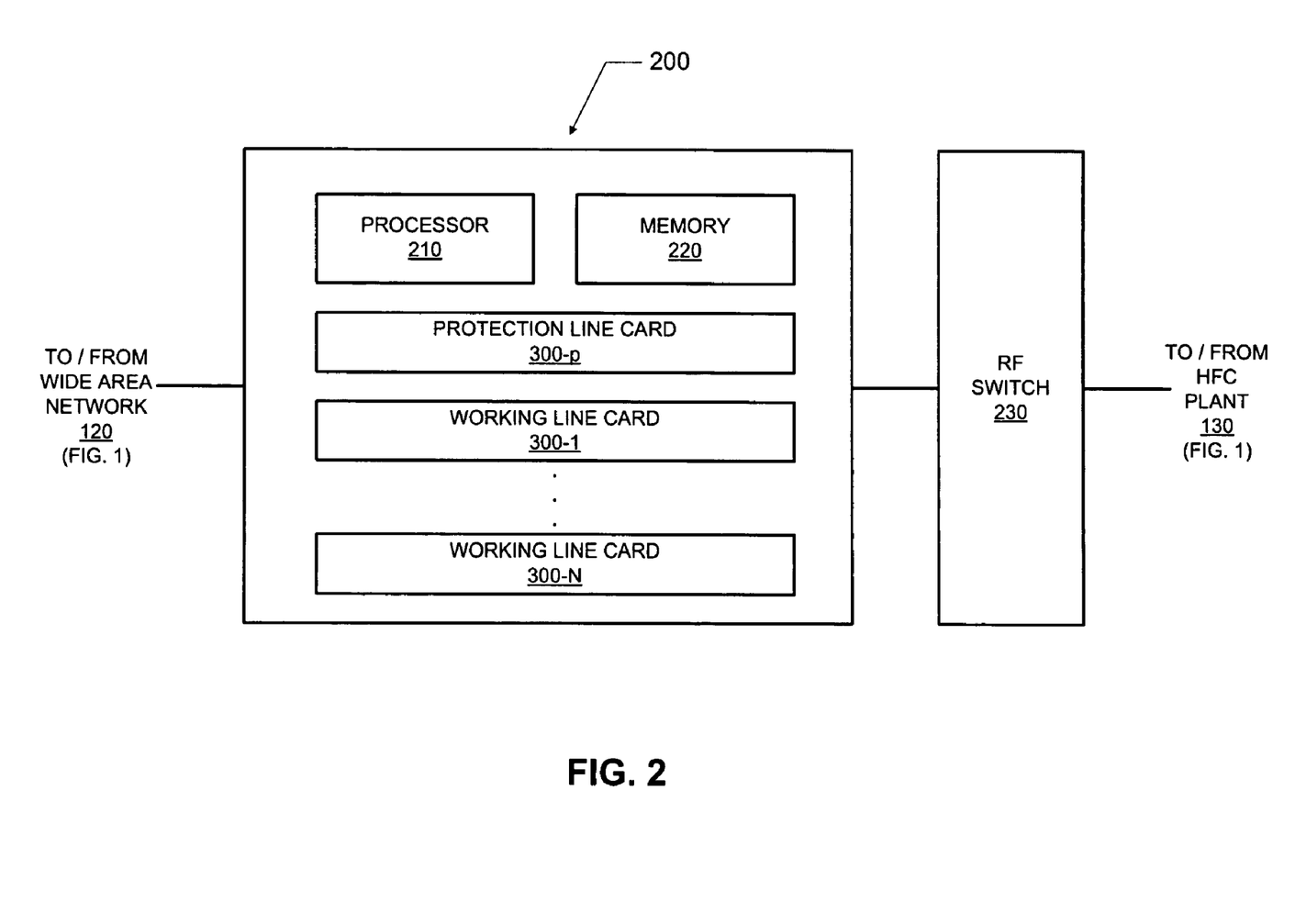
FIG. 2 illustrates an example cable modem termination system router.

FIG. 2 illustrates an example CMTS router 200. The CMTS router includes processor 210, memory 220, protection CMTS line card 300-p, working CMTS line cards 300-1, . . . , 300-N, and RF switch 230. An example CMTS router is the Cisco uBR10012 Universal Broadband Router available from Cisco Systems, Inc. of San Jose, Calif. The RF switch 230 serves to connect the working and/or protection line cards to the HFC plant.

Figure 3:
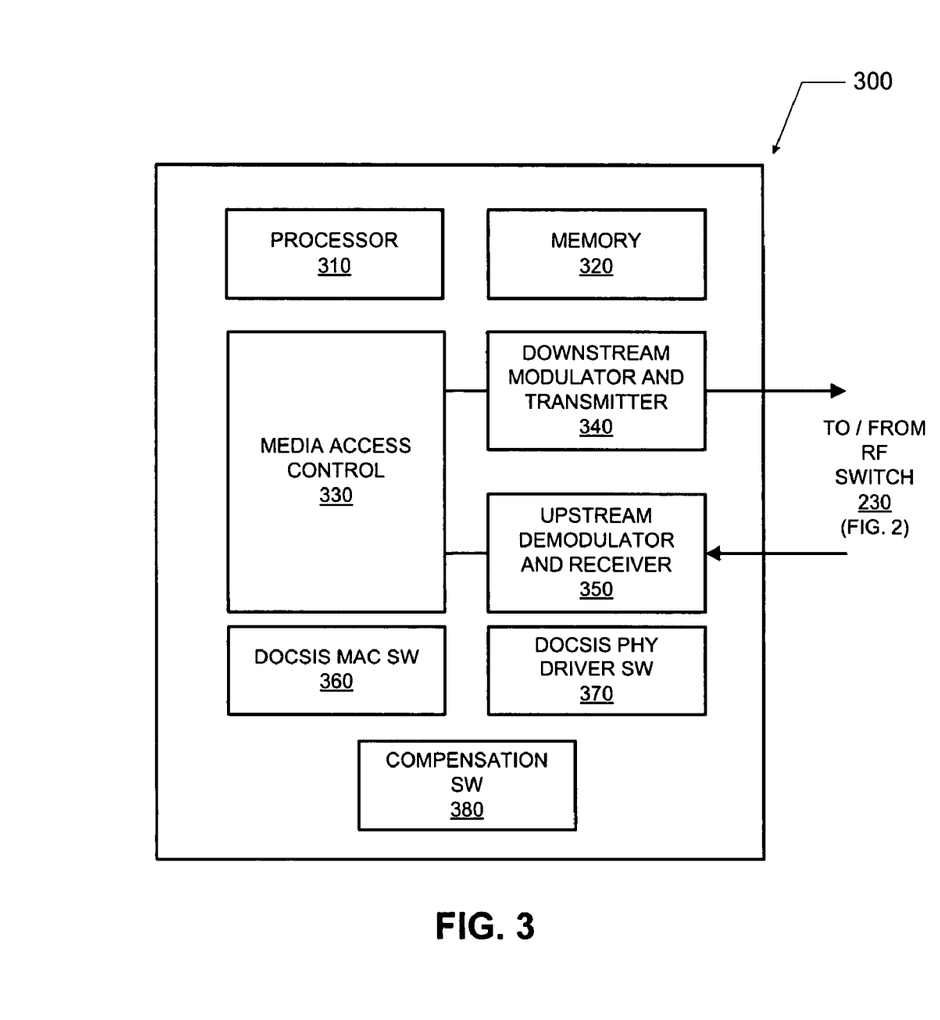
FIG. 3 illustrates an example cable modem termination system line card.

FIG. 3 illustrates an example CMTS line card 300. In the specific embodiment as shown in FIG. 3, a CMTS line card 300 provides functions at the physical layer and Media Access Control (MAC) layer. Generally, the physical layer is responsible for receiving and transmitting RF signals on the cable plant. Hardware portions of the physical layer include a downstream modulator and transmitter 340 and an upstream demodulator and receiver 350. The physical layer also includes software 370 for driving the hardware components of the physical layer.

Upstream data signals (packets) arriving via the RF switch 230 are demodulated by the demodulator/receiver 350 and then passed to the MAC layer for processing. A primary purpose of the MAC layer is to encapsulate, with MAC headers, downstream packets and decapsulate, of MAC headers, upstream packets. In one embodiment, the encapsulation and decapsulation proceed as dictated by the above-mentioned DOCSIS standard for transmission of data or other information described in the "Data-Over-Cable Service Interface Specifications DOCSIS 2.0—Radio Interface Specifications" CM-SP-RFIv2.0-107-041210, Dec. 10, 2004 which is incorporated herein by reference for all purposes.

The MAC headers include addresses to specific modems or to a hub (if sent upstream). Note that the cable modems also include MAC addressing components. In the cable modems, these components encapsulate upstream data with a header containing the MAC address of the hub. The MAC layer block includes a MAC hardware portion 330 and a MAC software portion 360, which together serve the above-described functions. After the MAC layer block has processed the upstream information, it is then passed to a network layer block for causing the upstream information packet to be switched to an appropriate data network interface on the CMTS router 200 (FIG. 2) not shown. The network layer may be included, for example, as part of the conventional router functions of the CMTS router 200. When a packet is received at the data network interface from an external source, switching software within the network layer passes the packet to the MAC layer. MAC block 330 then transmits information via a one-way communication medium to downstream modulator and transmitter 340. Downstream modulator and transmitter 340 takes the data (or other information) in a packet structure and converts it to modulated downstream frames, such as MPEG or ATM frames, on the downstream carrier using, for example, QAM 64 modulation (other methods of modulation can be used such as CDMA (Code Division Multiple Access) OFDM (Orthogonal Frequency Division Multiplexing), FSK (FREQ Shift Keying)). The return data is likewise modulated using, for example, QAM 16 or QSPK.

As shown in FIG. 3, CMTS line card 300 includes a processor 310 and memory 320. These hardware components interact with software and other hardware portions of the various layers within the CMTS. They provide general purpose computing power for much of the software. Memory 320 may include, for example, I/O memory (e.g., buffers), program memory, shared memory, etc. The compensation functions of the present approach may be implemented in software portion 380. In one embodiment, the software entities 360, 370 and 380 are implemented as part of a network operating system running on CMTS 200 (FIG. 2). Of course, the compensation logic could reside in hardware, software, or some combination of the two. For example, an apparatus illustrated in FIG. 11 (described later) implements the compensation functions.

The procedures employed by the working and protecting CMTSs during switchover are preferably performed at the MAC layer of the CMTS logic. Thus, in CMTS line card 300, most of the switchover operations may be performed by the hardware and software provided for the MAC layer.

Although the system shown in FIGS. 2 and 3 represents one specific CMTS architecture of the present approach, it is by no means the only CMTS architecture on which the present approach can be implemented. For example, other types of interfaces and media could also be used with the CMTS.

The cable network described herein in reference to the DOCSIS specification. It should be understood that the principles of the present approach to switchover may be applied to other communication protocols.

In the DOCSIS specification, the upstream channel is modeled as a stream of mini-slots. The CMTS generates a time reference for identifying these slots. The CMTS controls access to these slots by the cable modems, for example, by granting some number of contiguous slots to a CM for it to transmit data. The CM times its transmission so that the CMTS receives it in the time reference specified.

The basic mechanism for assigning bandwidth management is the allocation MAP, a MAC management message transmitted by the CMTS on the downstream channel which describes, for some interval, the uses for the upstream mini-slots. A given MAP typically describes some slots as grants for particular CMs to transmit data in, other slots are available for contention transmission, and other slots as an opportunity for new CMs to join the network. Each CM has one or more short (14-bit) service identifiers (SIDs) as well as a 48-bit MAC address.

The allocation MAP includes a variable number of information elements (IEs) that each define an allowed usage for a range of mini-slots. Each IE includes a service identifier (SID). A broadcast SID is intended for all CMs. A unicast SID is intended for a particular CM. Each CM has one or more SIDs as well as a 48-bit address. A null SID is addressed to no CM.

An initial Maintenance IE when used with the broadcast SID provides an interval in which new CMs may join the network. A long interval, equivalent to the maximum round-trip propagation delay plus the transmission time of Ranging Request (RNG-REQ) message is provided to allow new CMs to perform initial ranging. A Station Maintenance (SM) IE provides an interval in which CMs are expected to perform some aspect of routine network maintenance, such as ranging or power adjustment.

To compensate for large delays in the cable network, the CMs are required to time their transmissions precisely to arrive at the CMTS at the start of an assigned mini-slot. To accomplish this, two pieces of information are needed at each CM: 1) a global timing reference sent downstream from the CMTS to all CMs and 2) a timing offset, calculated during a ranging process, for each CM. The broadcast initial ranging process is used to provide initial ranging for the individual CMs. Subsequently, each CM waits for an individual Station Maintenance (SM) region and transmits a ranging request message. The CMTS returns a ranging response message to the CM with a fine tuning of the timing offset. The ranging request/response steps are repeated until the response contains a ranging successful notification or the CMTS aborts ranging. Once successfully ranged, the CM may join normal data traffic in the upstream. Periodically, a ranging opportunity is provided to the CMs so as to keep the CM ranged.

Figure 4:
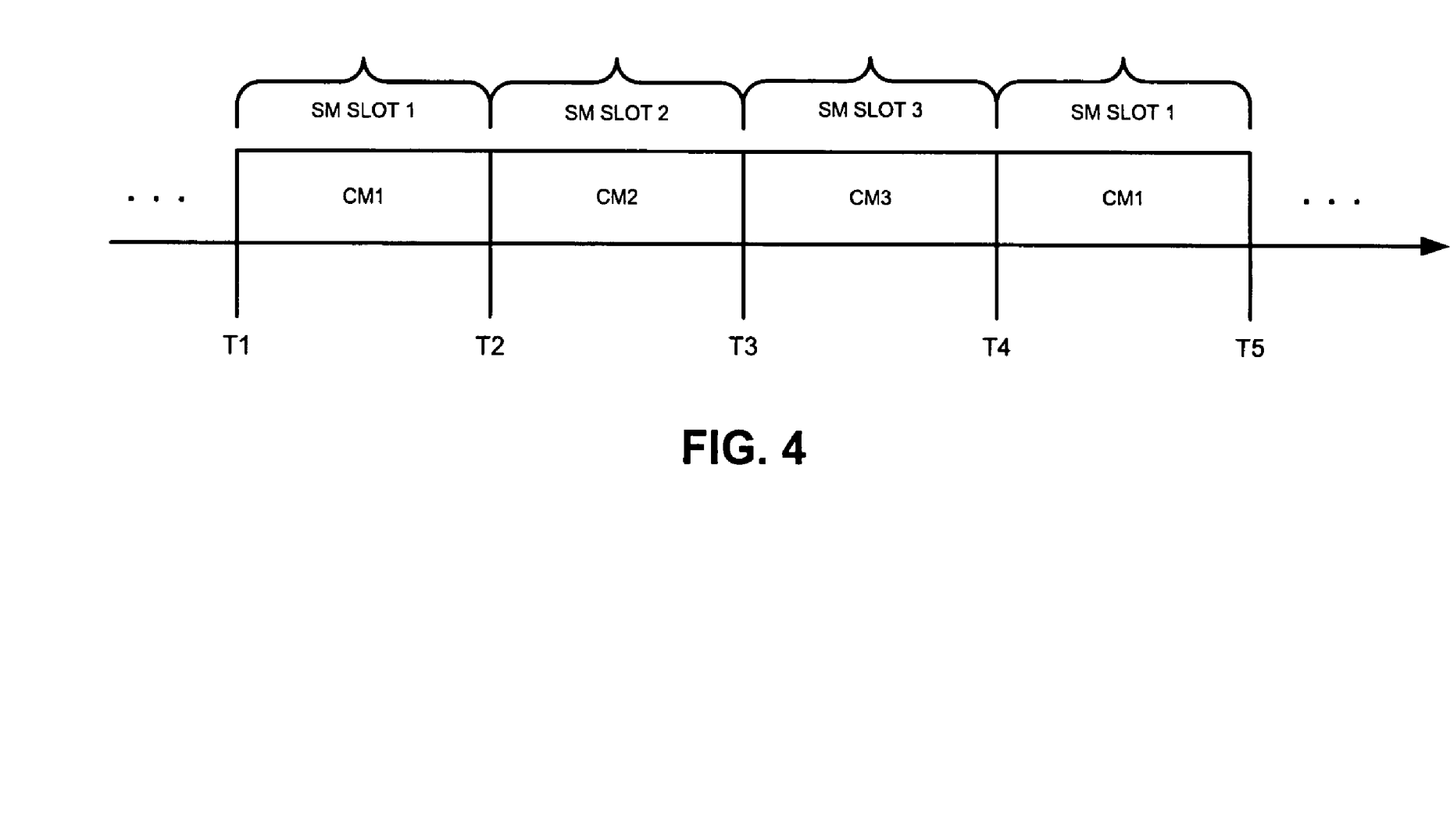
FIG. 4 illustrates ranging timing.

FIG. 4 illustrates ranging timing as received at the CMTS for a portion of slots allocated by a MAP allocation message. As shown, transmission for Station Maintenance messages from a first CM (CM1) starts to arrive at time T1 and ends at time T2. These are referred to as SM slots. At time T2, the transmission from a second CM (CM2) starts to arrive and ends at time T3. The transmission from a third CM (CM3) starts to arrive at T3 and ends at time T4. The next transmission from the first CM (CM1) starts at time T4 and ends at time T5, and so on.

Figure 5:
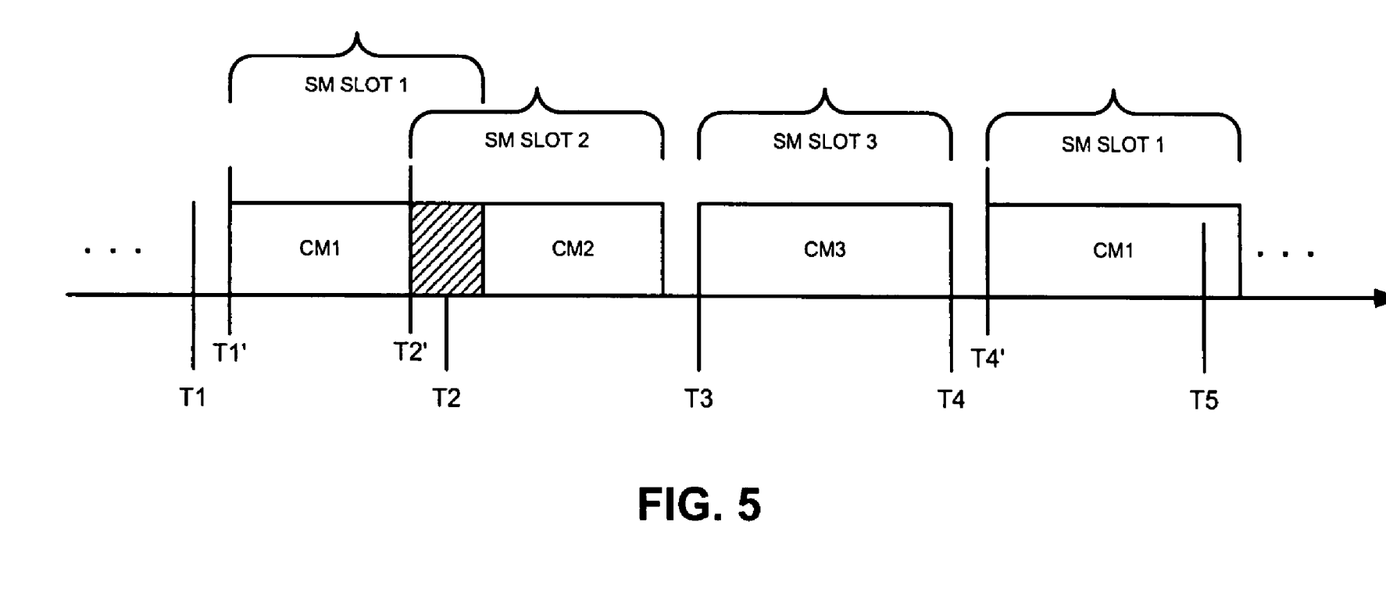
FIG. 5 illustrates ranging timing after switchover to a cable modem termination system protection line card.

FIG. 5 illustrates ranging timing after switchover to a CMTS protection line card. In this case, each cable modem timing offset is likely to change by differing amounts. In the illustrated example, assume the timing offset for CM1 increases and the timing offset decreases for CM2. The transmission from CM1 arrives at time T1', which is later than time T1. The transmission from CM2 arrives at time T2', which is earlier than T2. Thus, a portion of the transmissions for CM1 and CM2 collide. Because of the collision, the transmissions do not arrive at the expected time at the CMTS, and the ranging is missed. After a number of such misses, (16 is default), the CMs (CM1 and CM2) go offline.

Because a goal is to not miss ranging even if a timing offset changes, a solution is to (i) translate a first ranging timing description describing at least a duration of time during which a subject cable modem (CM) may burst and a duration of time during which the subject CM and other CMs in a multiple access network (e.g., a TDMA or SCDMA) are not permitted to burst into a second ranging timing description describing a duration during which a burst from the subject CM is expected to be received by a cable modem termination system (CMTS); and (ii) condition the CMTS to receive a burst from the subject CM during the duration of time described by the second ranging timing description.

A convenient embodiment of the solution is to create or otherwise use two MAP allocation messages (also referred to as bandwidth allocation maps); a first MAP allocation message is for use by a CM describing ranging timing at the CM and a second MAP allocation message for use by a CMTS describing ranging timing at the CMTS.

The first MAP allocation message describes a burst region during which a subject CM may burst and an idle region preceding and succeeding the burst region during which the subject CM and other CMs are not permitted to burst. The second MAP allocation message describes a region during which a burst from the subject CM is expected to be received by the CMTS. The region described by the second MAP allocation message includes the burst region described by the first MAP allocation message and is expanded by the idle regions also described by the first MAP allocation message. In this way, it may be said that the first MAP allocation message is "translated" into the second MAP allocation message.

By expanding the region during which a burst from the CM is expected to be received by the CMTS by the idle regions, the CMTS may be said to be "conditioned" to receive a burst "earlier" in time, in an event, the CM sends a burst early and conditioned to receive a burst "later" in time, in an event, the CM sends the burst later.

Figure 6:
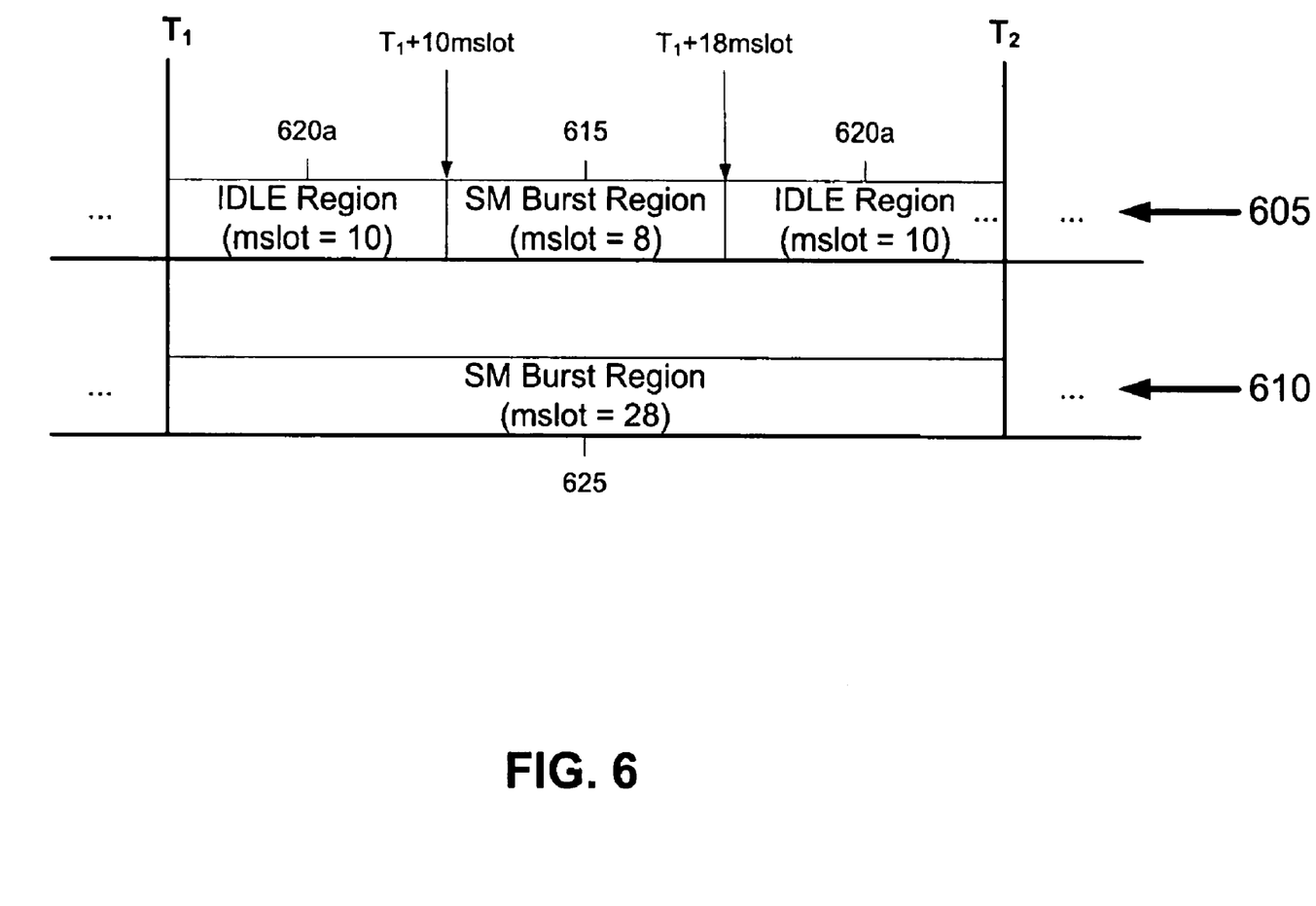
FIG. 6 illustrates ranging timings at a subject cable modem and a cable modem termination system described by a first MAP allocation message and second MAP allocation message, respectively.

FIG. 6 illustrates a ranging timing at a subject CM 605 described by a first MAP allocation message (described later in reference to FIG. 7) and a ranging timing at a CMTS 610 described by a second MAP allocation message (also described later in reference to FIG. 7). The ranging timing at the subject CM 605 starts at a time $T_1$ and ends at a time $T_2$. In this example, the ranging timing at the subject CM 605 includes an SM burst region 615 having a duration of 8 minislots. Preceding and succeeding the SM burst region 615 are idle regions, hereinafter, "added idle regions" 620a and 620b, each having a duration of 10 minislots. As such, in this example, from the time $T_1$ to a time $T_1+10$ minislots and from a time $T_1+18$ minislots to the time $T_2$, no CM including the subject CM is permitted to burst or otherwise provide upstream communications. This subject CM (and no other CM in an multiple access network) may burst between the time $T_1+10$ minislots and the time $T_1+18$ minislots.

As the ranging timing at the subject CM 605 in FIG. 6 illustrates, the subject CM is expected to burst between the time $T_1+10$ minislots and $T_1+18$ minislots. However, it is possible, that the subject CM may burst earlier (i.e., before the time $T_1+10$ minislots) or later (i.e., after the time $T_1+18$ minislots). This may be the case when a CM is load balanced or otherwise switched between two downstream (DS) channels which are not precisely synchronize, for example, one of the channels is integrated and the other is modular.

To address the foregoing possibility, in the ranging timing at the CMTS 610, an SM burst region during which a burst from the CM is expected to be received by the CMTS, hereinafter an "expanded burst region" 625 is expanded. In this example, the expanded burst region 625 is expanded such that the region 625 starts at $T_1$ (contrasted with $T_1+10$ minislots) and ends at $T_2$ (contrasted with $T_1+18$ minislots) for duration of 28 minislots (contrasted with 8 minislots). Accordingly, a burst is received by the CMTS even if the burst from the CM is sent earlier (e.g., at $T_1+9$ minislots) or later (e.g., $T_1+19$ minislots).

Figure 7:
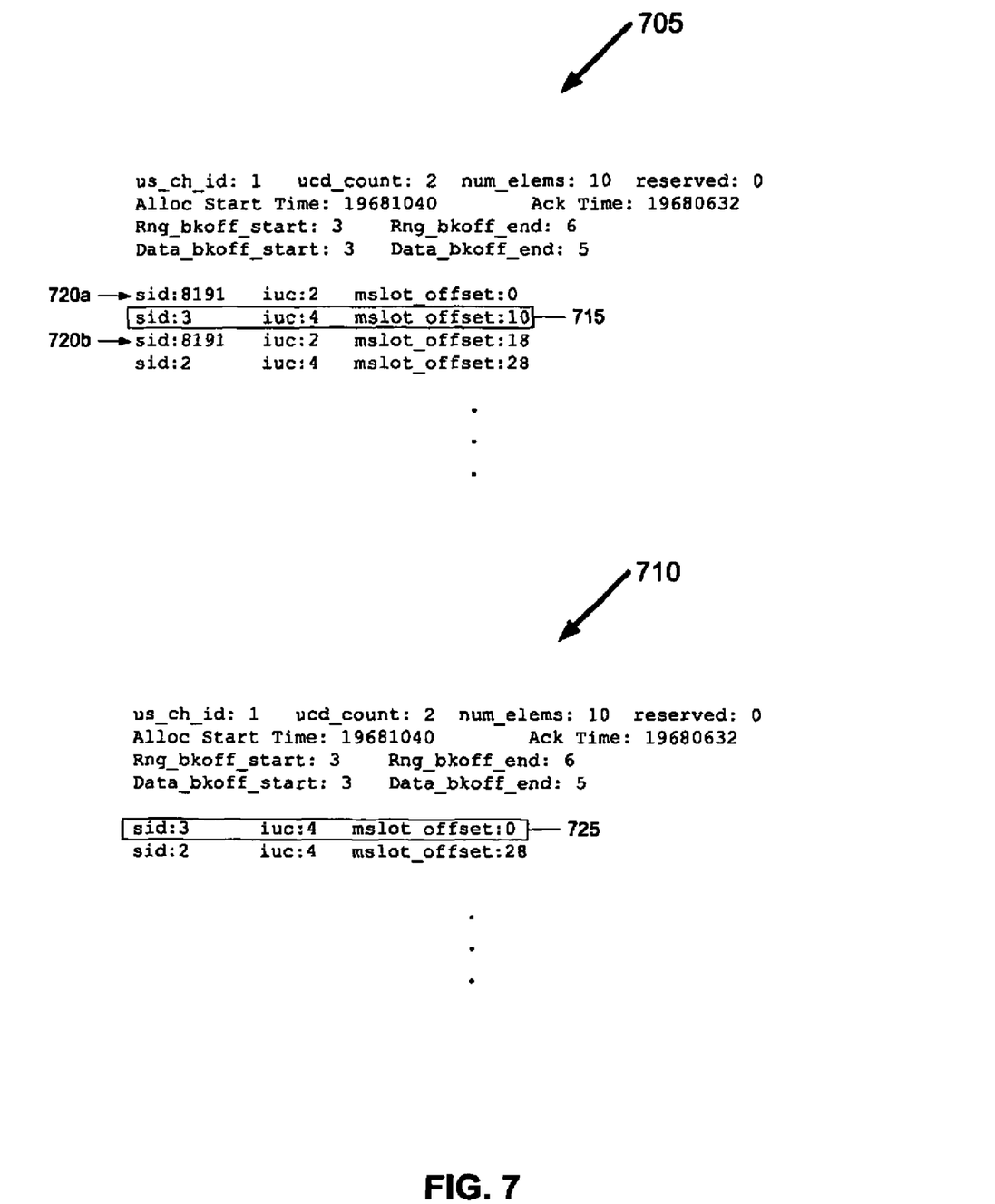
FIG. 7 illustrates an example first MAP allocation message and an example second MAP allocation message describing the ranging timings of FIG. 6.

FIG. 7 illustrates an example first MAP allocation message 705 describing the ranging timing at the subject CM 605 of FIG. 6 and an example second MAP allocation message 710 describing the ranging timing at the CMTS 610 also of FIG. 6. The first MAP allocation message 705 allocates an SM burst region 715 to the subject CM identified by a service identifier of 3 (SID: 3) starting at 10 minislots (mslot_offset: 10). Preceding and succeeding the SM burst region 715 are added idle regions 720a and 720b (SID: 8191) starting at 0 minislots (mslot: 0) and 18 minislots (mslot: 18), respectively. As such, the subject CM may burst starting at 10 minislots and ending at 17 minislots for a duration of 8 minislots. The second MAP allocation message 710 expands an expanded burst region 725. The expanded burst region 725 starts from 0 minislots and ends at 27 mini slots. This is contrasted with the subject CM being allocated the SM burst region 715 starting at 10 minislots and ending at 17 minislots.

As such, the CMTS expects to receive a burst from the subject CM during a 28 minislot region or "window," while the subject CM may send a burst during an 8 minislot window. Even if the subject CM sends a burst outside of (i.e., before or after) this 8 minislot window because of a change in the timing offset of the subject CM, the CMTS may still receive the burst during the 28 minislot window. In this way, ranging may not be missed even if a timing offset for the subject CM changes.

Figure 8:
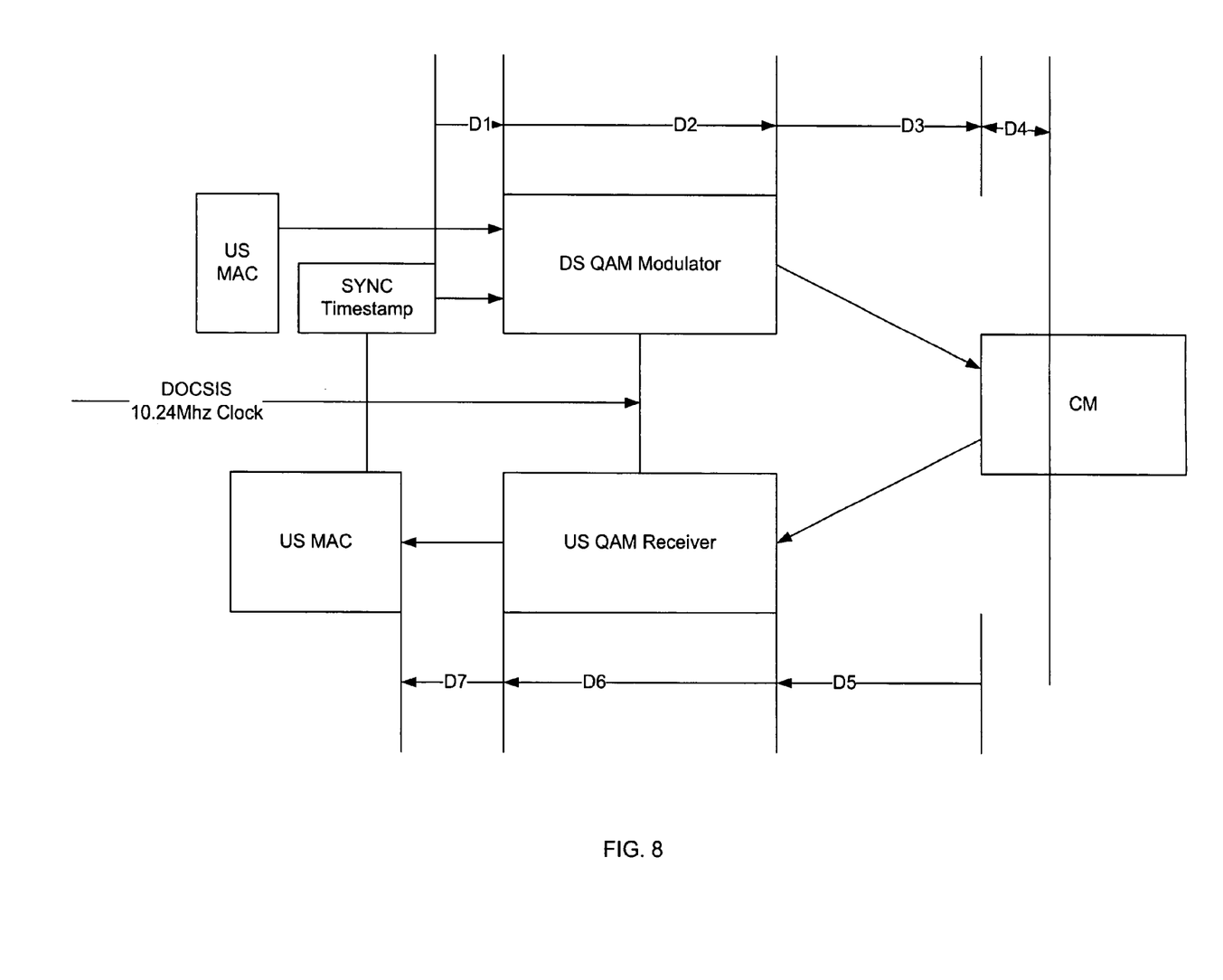
FIG. 8 illustrates example delay components contributing to a timing offset or round-trip delay from a subject cable modem and a cable modem termination system.

FIG. 8 illustrates various example delay components contributing to a "timing offset" or round-trip propagation delay from a subject cable modem (CM) and a cable modem termination system (CMTS). Delay components labeled D[n], where n=1 . . . 8 for both upstream (US) and downstream (DS) paths are described as follows:

D1. SYNC Timestamp is a periodic MAC management message from CMTS to CM to tell cable modem what current time is. SYNC is generated by DS MAC processor for an integrated CMTS. For Modular-DS, EQAM is synchronized to a DTI server, and inserts its timestamp into the SYNC frame. Delay is introduced from the time when timestamp is inserted, to the time when the SYNC frame is clocked as serial bit-stream to DS QAM modulator.

D2. DS QAM Modulator takes serial digital stream into modulated waveform. Modulator introduces delay due to various byte-interleaver settings, QAM constellation, or symbol rates. There are additional delays due to each vendor's implementation of each stages of digital signal processing.

D3. This represents DS RF transmit propagation delay.

D4. Cable modem's internal processing delay, and its internal, initial delay adjustment.

D5. This represents US RF transmit propagation delay.

D6. This represents US QAM receiver processing delay, which is vendor specific implementation of equalizer or receive filter bulk-delay line, or decoder processing.

D7. MAP IE or DOCSIS clock delay. This is through a programmable register on US MAC to adjust the arrival time of individual IE to US QAM Receiver (Demodulator).

Typically, in a switchover or failover scenarios, delay components D3, D4, and D5 remain constant because they are plant and modem specific. In contrast, delay components D1 and D2 on the DS path, and D6 and D7 on the US path change during a switchover or failover. As such, these delay components (D1, D2, D6, and D7) contribute to a change in timing offsets causing there to be a difference between a timing offset for a CM before the switchover and a timing offset for the CM after the switchover.

As a corollary, because delay components D3, D4, and D5 are plant and modem specific, and thus remain constant during a switchover or channel change, a change in timing offsets caused by the D1, D2, D6, and D7 delay components determined for a subject CM also applies for other CMs undergoing a similar switchover or channel change.

One of ordinary skill in the art will readily recognize that other delay components may contribute to a timing offset and a change in timing offsets. For example, there may be one or more intermediate nodes between the CMTS and the CM. It should be readily apparent that embodiments of the present approach contemplate both determining a timing offset made up of the aforementioned delay components and determining a timing offset made up other delay components.

Figure 9A:
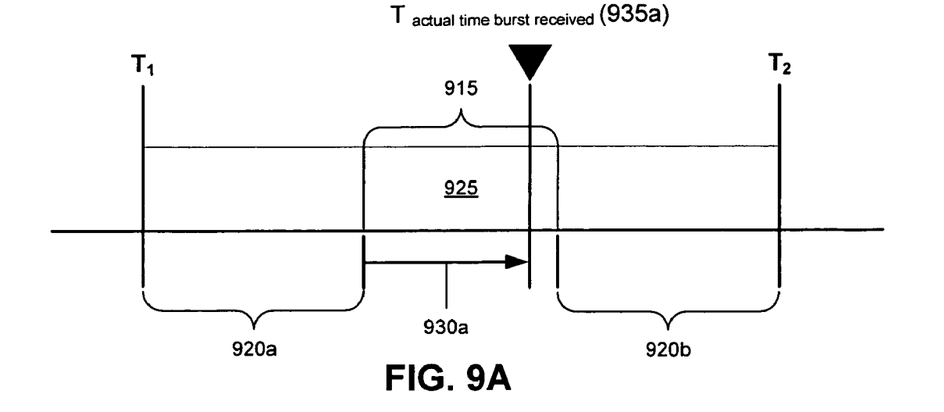
FIGS. 9A-C illustrate determining a timing offset.
Figure 9B:
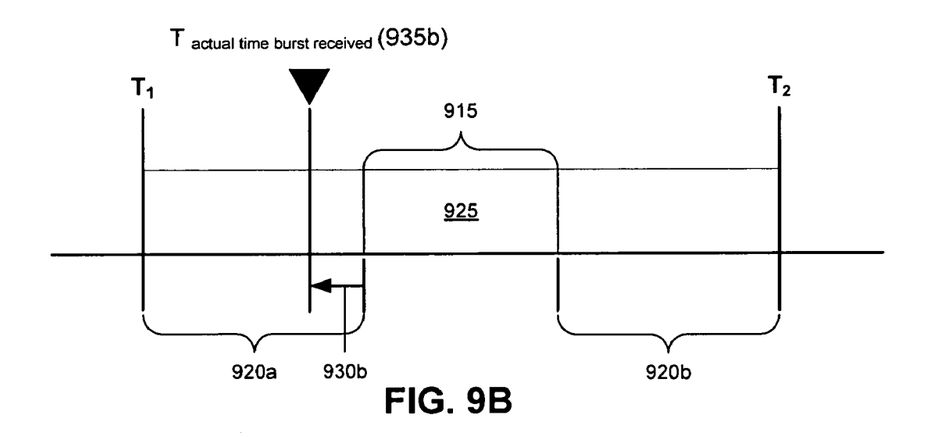
Figure 9C:
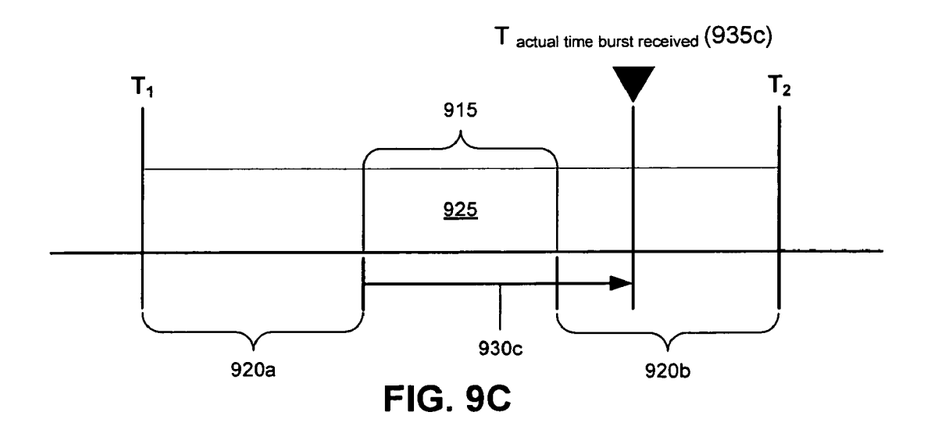

FIGS. 9A-C illustrate determining a timing offset from at least an actual time a burst from a subject cable modem (CM) is received by a cable modem termination system (CMTS), denoted as "$T_{actual\ time\ burst\ received}$" 935a . . . c, and a duration of time during which the subject CM and other CMs in a multiple access network are not permitted to burst.

In the examples illustrated in FIGS. 9A-C, a burst from the subject CM is received during an expanded burst region 925 during which a burst of the CM is expected to be received by the CMTS. A burst region 915 during which the subject CM may burst and added idle regions 920a and 920b during which the subject CM and other CMs are not permitted to burst are denoted as brackets and illustrated over the expanded burst region 925.

In FIG. 9A, a burst from the subject CM is received by the CMTS at the $T_{actual\ time\ burst\ received}$ 935a. The $T_{actual\ time\ burst\ received}$ 935a falls within the burst region 915, i.e., during a duration of time during which the subject CM may burst. As such, it may be said that CM sent the burst to the CMTS "timely."

In FIG. 9B, a burst from the subject CM is received by the CMTS at the $T_{actual\ time\ burst\ received}$ 935b. The $T_{actual\ time\ burst\ received}$ 935b falls outside the burst region 915, before the burst region 915, and in the added idle region 920a, i.e., during a duration of time during which the subject CM are not permitted to burst. As such, it may be said that the CM sent the burst to the CMTS "early."

In FIG. 9C, a burst from the subject CM is received by the CMTS at the $T_{actual\ time\ burst\ received}$ 935c. The $T_{actual\ time\ burst\ received}$ 935c falls outside the burst region 915, after the burst region 915, and in the added idle region 920b, i.e., during a duration of time during which the subject CM are not permitted to burst. As such, it may be said that the CM sent the burst to the CMTS "late."

The examples of FIGS. 9A-C further illustrate that the timing offsets 930a, 930b, and 930c may be determined, for example, by subtracting from the actual time a burst from the subject CM is received by a CMTS ($T_{actual\ time\ burst\ received}$) 935a . . . c, at least the added idle region 920a.

As previously described, a timing offset or round-trip delay from a cable modem (CM) and a cable modem termination system (CMTS) may change, for example, when switching from a failed CMTS line card to a protection CMTS line card during a switchover or when changing downstream channels during load balancing. Accordingly, in a convenient embodiment, having determined a determined timing offset for a subject CM, a change in the determined timing offset and a timing offset previously determined for the subject CM may be further determined to produce a determined change in timing offset. The determined change in timing offset reflects a difference (delta) in timing offsets or delays caused by differences in delay components. For example, in load balancing with DCC in which a subject CM is moved or DCCed from a first downstream (DS) channel to a second DS channel to distribute the load of the subject CM, there is a difference between a first timing offset for the subject CM on the first DS channel and a second timing offset for the subject CM on the second DS channel because the two channels are not precisely synchronized with each other.

In a switchover example in which a failed CMTS line card is switched over to a protection CMTS line card, a timing offset for a subject CM previously determined (i.e., a round-trip propagation delay between the subject CM and the failed CMTS line card) differs from a timing offset for the subject CM determined in response to the switchover (i.e., a round-trip propagation delay between the subject CM and the protection CMTS line card).

In the above examples, for other CMs undergoing a similar channel change or switchover as the subject CM, the determined change in timing offset (as determined with respect to the subject CM) also applies to the other CMs. As such, it may not be necessary to determine timing offsets for the other CMs in the same manner as previously described. Instead, timing offsets previously determined for the other CMs may be adjusted with the determined change in timing offset to produce adjusted timing offsets. Similar to the determined timing offset for the subject CM, the adjusted timing offsets for the other CMs compensate of delays in the multiple access network and the other CMs. As such, this embodiment may reduce both an amount of time and network resources needed to compensate of delays in the multiple access network and the other CMs In another convenient embodiment, the previously described adjusted timing offsets are reported to other CMs by sending unsolicited ranging responses with the adjusted timing offsets to the other CMs.

Figure 10:
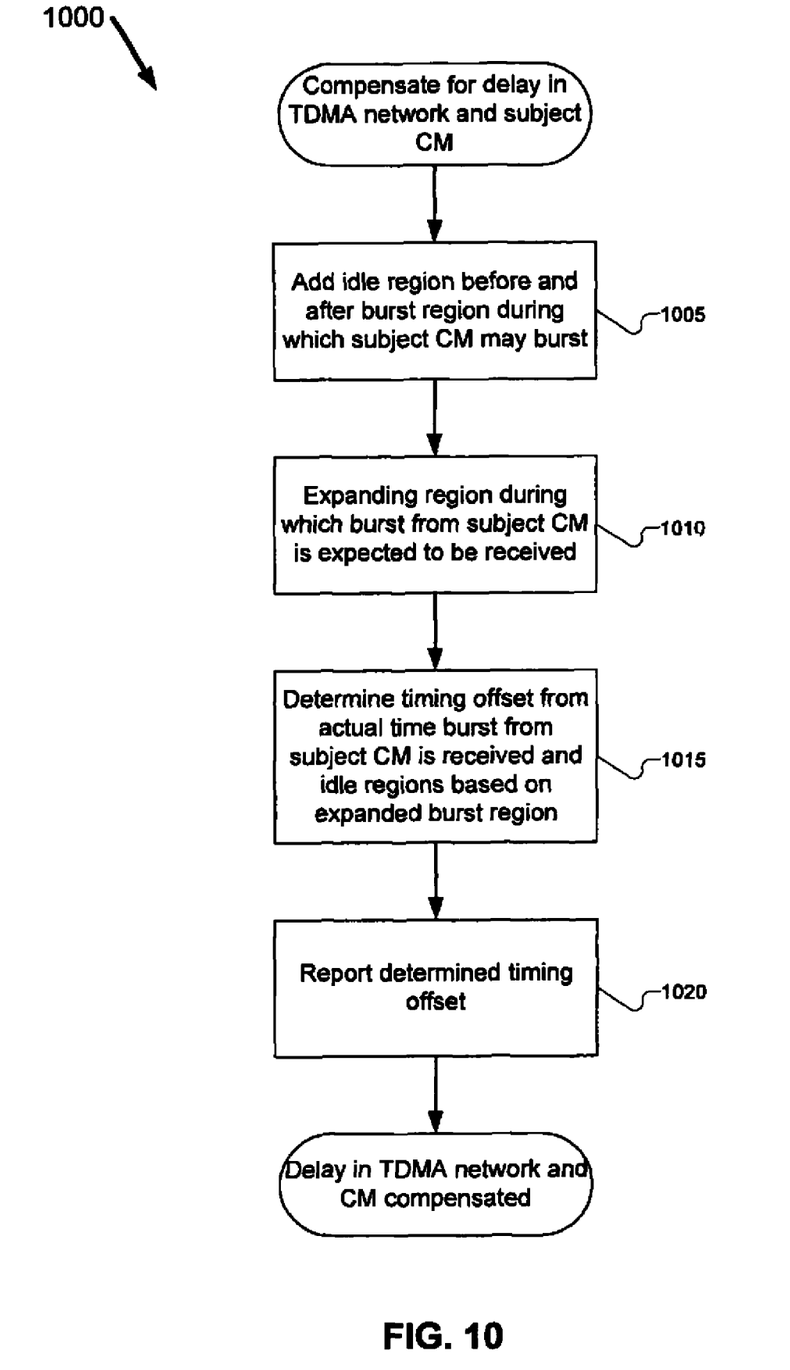
FIG. 10 illustrates an example process for compensating for delay in a multiple access network and a subject cable modem.

FIG. 10 illustrates an example process 1000 for compensating for delay in a multiple access network (e.g., a TDMA and SCDMA network) and a subject cable modem (CM). The example process 1000, in a first bandwidth allocation map for use by a subject CM, adds (1005) an idle region before and after a burst region during which the subject CM may burst to form added idle regions. The subject CM and other CMs in a multiple access network are not permitted to burst during the added idle regions. The example process 1000, in a second bandwidth allocation map for use by a cable modem termination system (CMTS), expands (1010) a region during which a burst from the subject CM is expected to be received by the CMTS by the added idle regions to form an expanded burst region.

The example process 1000 determines (1015) a timing offset from an actual time a burst from the subject CM is received by the CMTS and the added idle regions based on the expanded burst region to produce a determined timing offset. The example process 1000 reports (1020) the determined timing offset to, for example, the subject CM. The example process 1000 ends with the delay in the multiple access network and the subject CM compensated.

Figure 11:
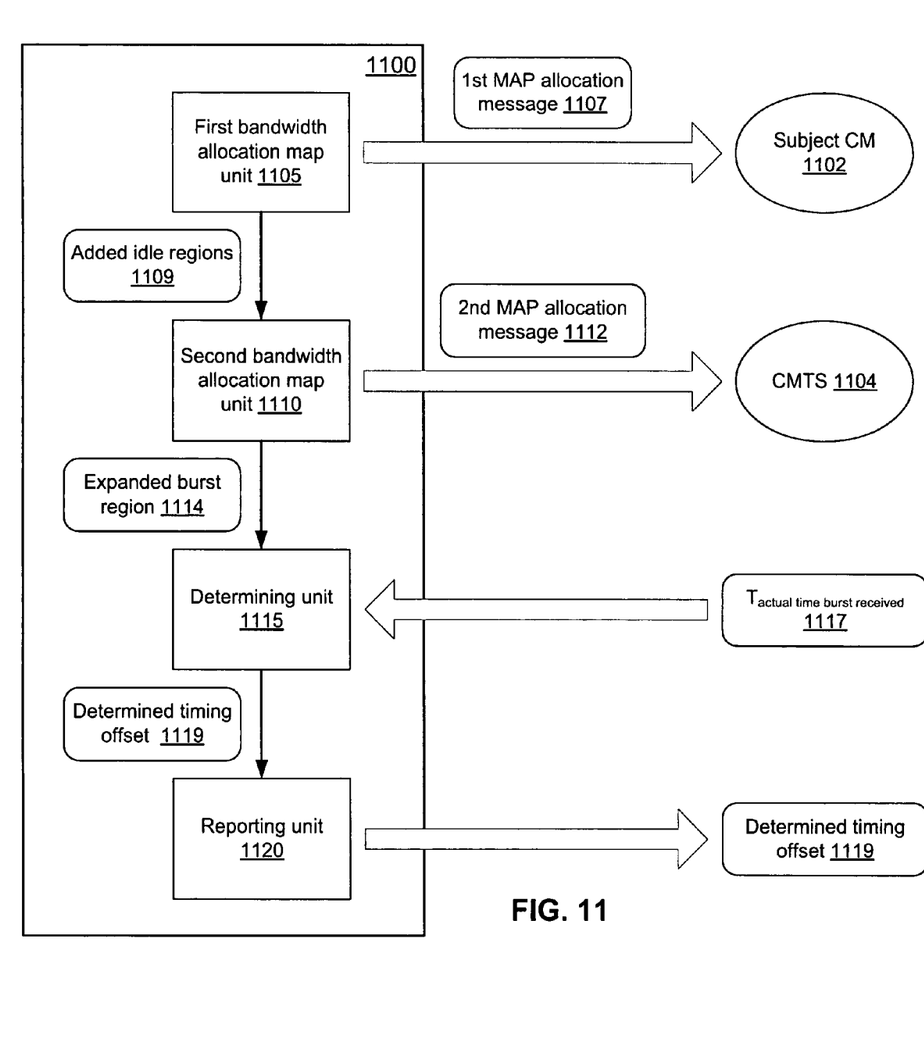
FIG. 11 illustrates an example apparatus to compensate for delay in a multiple access network and a subject cable modem.

FIG. 11 illustrates an example apparatus 1100 to compensate for delay in a multiple access network (e.g., TDMA and SCDMA) and a subject cable modem (CM) 1102. The apparatus 1100 has a first bandwidth allocation map unit 1105, a second bandwidth allocation map unit 1110, a determining unit 1115, and a reporting unit 1120. The first bandwidth allocation map unit 1105, in a first bandwidth allocation map 1107 for use by a subject CM 1102, adds an idle region before and after a burst region during which the subject CM 1102 may burst to form added idle regions 1109. The subject CM 1102 and other CMs in the multiple access network are not permitted to burst during the added idle regions 1109.

Coupled to the first bandwidth allocation map unit 1105, the second bandwidth allocation map unit 1110, in a second bandwidth allocation map 1112 for use by a cable modem termination system (CMTS) 1104, expands a region during which a burst from the subject CM 1102 is expected to be received by the CMTS by the added idle regions 1109 to form an expanded burst region 1114.

Coupled to the second bandwidth allocation map unit 1110, the determining unit 1115 determines a timing offset from an actual time 1117 a burst from the subject CM 1102 is received by the CMTS 1104 and the added idle regions 1109 based on the expanded burst region 1114 to produce a determined timing offset 1119.

Coupled to the determining unit 1115, the reporting unit 1120 reports the determined timing offset 1119 to, for example, the subject CM 1102 to compensate for delay in the multiple access network and the subject CM 1102.

While this invention has been particularly shown and described with references to example embodiments thereof, it will be understood by those skilled in the art that various changes in form and details may be made therein without departing from the scope of the invention encompassed by the appended claims.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of computer readable medium, such as random access memory (RAM), read only memory (ROM), compact disk read only memory (CD-ROM), and so forth. In operation, a general purpose or application specific processor loads and executes the software in a manner well understood in the art.

What is claimed is:

1. A method comprising:
in a processor:
in a first bandwidth allocation map for use by a subject cable modem (CM), adding an idle region before and after a burst region during which the subject CM may burst to form added idle regions, the subject CM and other CMs in a multiple access network are not permitted to burst during the added idle regions;
in a second bandwidth allocation map for use by a cable modem termination system (CMTS), expanding a region during which a burst from the subject CM is expected to be received by the CMTS by the added idle regions to form an expanded burst region;
determining a timing offset from an actual time a burst from the subject CM is received by the CMTS and the added idle regions based on the expanded burst region to produce a determined timing offset; and
reporting the determined timing offset to compensate for delay in the multiple access network and the subject CM.

2. The method of claim 1 wherein adding, expanding, determining, and reporting are in response to switching over from a working CMTS to a protecting CMTS.

3. The method of claim 1 wherein adding, expanding, determining, and reporting are in response to a Dynamic Channel Change (DCC) moving a load of the subject CM from a first downstream (DS) channel to a second DS channel in the multiple access network.

4. The method of claim 1 wherein reporting includes sending a ranging response with the determined timing offset to the subject CM.

5. The method of claim 1 further comprising:
determining a change in the determined timing offset and a timing offset previously determined for the subject CM to produce a determined change in timing offset; and
adjusting timing offsets previously determined for other CMs in the multiple access network with the determined change in timing offset to produce adjusted timing offsets.

6. The method of claim 5 wherein reporting includes sending unsolicited ranging responses with the adjusted timing offsets to the other CMs in the multiple access network.

7. The method of claim 1 wherein the multiple access network is a Time Division Multiple Access (TDMA) network or Synchronous Code Division Multiple Access (SCDMA) network.

8. An apparatus comprising:
a compensation logic hardware having:
a first bandwidth allocation map unit to add in a first bandwidth allocation map for use by a subject cable modem (CM), an idle region before and after a burst region during which the subject CM may burst to form added idle regions, the subject CM and other CMs in a multiple access network are not permitted to burst during the added idle regions;
a second bandwidth allocation map unit coupled to the first bandwidth allocation map unit to expand in a second bandwidth allocation map for use by a cable modem termination system (CMTS), during which a burst from the subject CM is expected to be received by the CMTS by the added idle regions to form an expanded burst region;
a determining unit coupled to the second bandwidth allocation map unit to determine a timing offset from an actual time a burst from the subject CM is received by the CMTS and the added idle regions based on the expanded burst region to produce a determined timing offset; and
a reporting unit coupled to the determining unit to report the determined timing offset to compensate for delay in the multiple access network and the subject CM.

9. The apparatus of claim 8 wherein the first bandwidth allocation map unit, the second bandwidth allocation map unit, the determining unit, and the reporting unit are responsive to a switch over from a working CMTS to a protecting CMTS.

10. The apparatus of claim 8 wherein the first bandwidth allocation map unit, the second bandwidth allocation map unit, the determining unit, and the reporting unit are responsive to a Dynamic Channel Change (DCC) moving a load of the subject CM from a first downstream (DS) channel to a second DS channel in the multiple access network.

11. The apparatus of claim 8 wherein the reporting unit includes an interface coupled to the multiple access network to send a ranging response with the determined timing offset to the subject CM.

12. The apparatus of claim 8 further comprising:
a second determining unit coupled to the first determining unit to determine a change in the determined timing offset and a timing offset previously determined for the cable modem (CM) to produce a determined change in timing offset; and
an adjusting unit coupled to the second determining unit to adjust timing offsets previously determined for other CMs in the multiple access network with the determined change in timing offset to produce adjusted timing offsets.

13. The apparatus of claim 12 wherein the reporting unit includes an interface coupled to the multiple access network to send unsolicited ranging responses with the adjusted timing offsets to the other CMs in the multiple access network.

14. The apparatus of claim 8 wherein the multiple access network is a Time Division Multiple Access (TDMA) network or Synchronous Code Division Multiple Access (SCDMA) network.

15. A method comprising:
translating a first ranging timing description describing at least a duration of time during which a subject CM (cable modem) may burst and a duration of time during which the subject CM and other CMs in a multiple access network are not permitted to burst into a second ranging timing description describing a duration during which a burst from the subject CM is expected to be received by a CMTS;
conditioning the CMTS to receive a burst from the subject CM during the duration of time described by the second ranging timing description;
determining a timing offset from at least an actual time a burst from the subject CM is received by the CMTS and the duration of time during which the subject CM and other CMs in the multiple access network are not permitted to burst to produce a determined timing offset; and
reporting the determined timing offset to compensate for delay in the multiple access network and the subject CM.

16. The method of claim 15 wherein translating, conditioning, determining, and reporting are in response to switching over from a working cable modem CMTS to a protecting CMTS.

17. The method of claim 15 wherein translating, conditioning, determining, and reporting are in response to a Dynamic Channel Change (DCC) moving a load of the subject CM from a first downstream (DS) channel to a second DS channel in the multiple access network.

18. The method of claim 15 wherein reporting includes sending a ranging response with the determined timing offset to the subject CM.

19. The method of claim 15 further comprising:
determining a change in the determined timing offset and a timing offset previously determined for the subject CM to produce a determined change in timing offset; and
adjusting timing offsets previously determined for other CMs in the multiple access network with the determined change in timing offset to produce adjusted timing offsets.

20. The method of claim 19 wherein reporting includes sending unsolicited ranging responses with the adjusted timing offsets to the CMs in the multiple access network.

21. The method of claim 15 wherein the multiple access network is a Time Division Multiple Access (TDMA) network or Synchronous Code Division Multiple Access (SCDMA) network.

22. Logic encoded in one or more non-transitory computer readable medium for execution and when executed operable to:
in a first bandwidth allocation map for use by a subject cable modem (CM), add an idle region before and after a burst region during which the subject CM may burst to form added idle regions, the subject CM and other CMs in a multiple access network are not permitted to burst in the added idle regions;
in a second bandwidth allocation map for use by a cable modem termination system (CMTS), expand a region during which a burst from the subject CM is expected to be received by the CMTS by the added idle regions to form an expanded burst region;
determine a timing offset from an actual time a burst from the subject CM is received by the CMTS and the added idle regions based on the expanded burst region to produce a determined timing offset; and
report the determined timing offset to compensate for delay in the multiple access network and the subject CM.

23. Logic encoded in one or more non-transitory computer readable medium for execution and when executed operable to:
translate a first ranging timing description describing at least a duration of time during which a subject CM (cable modem) may burst and a duration of time during which the subject CM and other CMs in a multiple access network are not permitted to burst into a second ranging timing description describing a duration during which a burst from the subject CM is expected to be received by a CMTS;
condition the CMTS to receive a burst from the subject CM during the duration of time described by the second ranging timing description;
determine a timing offset from at least an actual time a burst from the subject CM is received by the CMTS and the duration of time during which the subject CM and other CMs in the multiple access network are not permitted to burst to produce a determined timing offset; and
report the determined timing offset to compensate for delay in the multiple access network and the subject CM.

* * * * *